(12) United States Patent
Selfors (10) Patent No.: US 7,980,018 B2
(45) Date of Patent: Jul. 19, 2011

(54) HANDLE FOR FISHING ROD

(76) Inventor: Robert Selfors, Nesoddtangen (NO)

( * ) Notice: Subject to any disclaimer, the term of this patent is extended or adjusted under 35 U.S.C. 154(b) by 0 days.

(21) Appl. No.: 12/171,921

(22) Filed: Jul. 11, 2008

(65) Prior Publication Data

US 2009/0013584 A1 Jan. 15, 2009

(30) Foreign Application Priority Data

Jul. 12, 2007 (NO) .................................. 20073599
Nov. 30, 2007 (NO) .................................. 20076177

(51) Int. Cl.
*A01K 87/08* (2006.01)
*A01K 87/00* (2006.01)

(52) U.S. Cl. .................................. 43/23; 43/18.1 R
(58) Field of Classification Search ......... 43/23, 18.1 R, 43/18.1 HR, 18.1 CT
See application file for complete search history.

(56) References Cited

U.S. PATENT DOCUMENTS

| | | | | |
|---|---|---|---|---|
| 206,264 A | * | 7/1878 | Robertson | 43/23 |
| 270,460 A | * | 1/1883 | Mitchell | 43/23 |
| 583,016 A | * | 5/1897 | Bacon | 43/23 |
| 828,557 A | * | 8/1906 | Levison | 43/23 |
| 841,761 A | * | 1/1907 | Bartlett | 43/23 |
| 887,753 A | * | 5/1908 | Beck | 43/18.1 R |
| 911,119 A | * | 2/1909 | Farr | 43/18.1 R |
| 980,942 A | * | 1/1911 | Hanson | 43/23 |
| 1,013,333 A | * | 1/1912 | Hanson | 43/23 |
| 1,351,473 A | * | 8/1920 | Forster | 43/18.1 R |
| 1,513,567 A | * | 10/1924 | Swihart | 43/15 |
| 1,593,957 A | * | 7/1926 | Shaver | 43/18.1 R |
| 1,625,510 A | * | 4/1927 | Tredwell | 43/18.1 R |
| 1,731,173 A | * | 10/1929 | Pope | 43/18.1 CT |
| 1,898,323 A | * | 2/1933 | Teetor | 43/23 |
| 1,931,303 A | * | 10/1933 | Bayard | 43/23 |
| 1,972,518 A | * | 9/1934 | Grandjean | 43/18.1 CT |
| 1,985,427 A | * | 12/1934 | Richardson | 43/18.1 R |
| 2,000,263 A | * | 5/1935 | Teetor | 43/23 |
| 2,018,923 A | * | 10/1935 | Potter | 43/23 |
| 2,065,153 A | * | 12/1936 | Proudfit | 43/18.1 R |
| 2,149,837 A | * | 3/1939 | Browne | 43/23 |
| D128,132 S | * | 7/1941 | Bell | 43/23 |
| 2,283,816 A | * | 5/1942 | Loutrel | 43/23 |

(Continued)

FOREIGN PATENT DOCUMENTS

DE 10202773 A1 * 7/2003

(Continued)

*Primary Examiner* — Darren W Ark
(74) *Attorney, Agent, or Firm* — RothWell, Figg, Ernst & Manbeck P.C.

(57) ABSTRACT

The present invention concerns a fishing rod for fly fishing, comprising an oblong, thin and elastic body, equipped with a reel for a fishing line, seated on the rod at the lower part of this, along with a gripping device consisting of a fore handle and/or a butt handle fastened to the fishing rod on the lower end of the rod on a level below the reel.

The handle is fastened on an angular lever in relation to the longitudinal axis of the rod, since the handle is situated on the extension of an imagined line, which stretches between the upper tip of the rod and the spin axis of the reel.

The gripping device may furthermore comprise a fore handle, fastened to the fishing rod at the rear end of the rod, preferably in the area where a reel seat is fastened to the rod. The handle is configured in such a manner that it allows the thin and elastic body to move relative to the handle.

15 Claims, 7 Drawing Sheets

U.S. PATENT DOCUMENTS

| | | | | |
|---|---|---|---|---|
| 2,306,638 A * | 12/1942 | Meisler | | 43/18.1 R |
| 2,483,071 A * | 9/1949 | Stine | | 43/18.1 R |
| 2,559,934 A * | 7/1951 | Briney | | 43/18.1 R |
| 2,577,575 A * | 12/1951 | Gephart | | 43/23 |
| 2,600,259 A * | 6/1952 | Palmer | | 43/23 |
| 2,685,755 A * | 8/1954 | Gorenflo | | 43/23 |
| 2,711,047 A * | 6/1955 | Shepherd | | 43/23 |
| 2,737,747 A * | 3/1956 | Benson et al. | | 43/23 |
| 3,006,098 A * | 10/1961 | Harke | | 43/23 |
| 3,073,055 A * | 1/1963 | Edwards et al. | | 43/23 |
| 3,216,144 A * | 11/1965 | Vojinov | | 43/18.1 R |
| 3,296,732 A * | 1/1967 | Magnus | | 43/23 |
| 3,372,510 A * | 3/1968 | Arsenault | | 43/23 |
| 3,415,002 A * | 12/1968 | Schaefer | | 43/18.1 R |
| 3,436,858 A * | 4/1969 | Shaffer | | 43/19 |
| 3,507,069 A * | 4/1970 | Borba Sr. | | 43/18.1 R |
| 4,014,129 A * | 3/1977 | Capra | | 43/23 |
| 4,051,617 A * | 10/1977 | Dorph | | 43/23 |
| 4,214,395 A * | 7/1980 | Caldwell, Jr. | | 43/18.1 R |
| 4,559,735 A * | 12/1985 | Batick, Jr. | | 43/21.2 |
| 4,644,680 A * | 2/1987 | Dawson | | 43/23 |
| 4,651,461 A * | 3/1987 | Williams | | 43/23 |
| 4,653,215 A * | 3/1987 | Strader | | 43/23 |
| 4,654,996 A * | 4/1987 | Gieselman | | 43/23 |
| 4,796,373 A * | 1/1989 | Struntz | | 43/23 |
| 4,822,087 A * | 4/1989 | DeCarlo | | 43/11 |
| 4,858,365 A * | 8/1989 | Struntz | | 43/23 |
| 4,878,309 A * | 11/1989 | Gough | | 43/23 |
| 5,159,775 A * | 11/1992 | Sutula, Jr. | | 43/21.2 |
| 5,197,218 A * | 3/1993 | Legard | | 43/23 |
| 5,237,770 A * | 8/1993 | Creek | | 43/23 |
| 5,259,140 A * | 11/1993 | Epperson | | 43/23 |
| 5,313,735 A * | 5/1994 | Latouche | | 43/23 |
| 5,363,586 A * | 11/1994 | Balkenbush | | 43/23 |
| 5,390,438 A * | 2/1995 | Warren, Jr. | | 43/23 |
| 5,774,937 A * | 7/1998 | Caminos | | 16/425 |
| 5,915,943 A * | 6/1999 | Grice | | 43/18.1 R |
| 5,992,079 A * | 11/1999 | Michels et al. | | 43/23 |
| 6,065,240 A * | 5/2000 | Paddock | | 43/21.2 |
| 6,067,741 A * | 5/2000 | Eaton | | 43/23 |
| 6,145,237 A * | 11/2000 | Young | | 43/18.1 R |
| 6,237,274 B1 * | 5/2001 | Head et al. | | 43/25 |
| 6,295,755 B1 * | 10/2001 | Macaluso | | 43/21.2 |
| 6,347,477 B1 * | 2/2002 | Hopper | | 43/18.1 R |
| 6,360,475 B1 * | 3/2002 | Lepage et al. | | 43/23 |
| 6,493,982 B1 * | 12/2002 | Macaluso | | 43/21.2 |
| 6,629,382 B2 * | 10/2003 | Irrgang et al. | | 43/23 |
| 6,748,691 B2 * | 6/2004 | Doucette | | 43/21.2 |
| 6,763,628 B1 * | 7/2004 | Bartlett | | 43/23 |
| 6,922,936 B2 * | 8/2005 | Markley et al. | | 43/23 |
| 6,931,781 B2 * | 8/2005 | Markley et al. | | 43/23 |
| 7,086,195 B2 * | 8/2006 | Borgeat | | 43/18.1 CT |
| 7,089,699 B2 * | 8/2006 | Borgeat | | 43/18.1 R |
| 7,168,201 B2 * | 1/2007 | Markley et al. | | 43/18.1 R |
| 7,226,365 B2 * | 6/2007 | Qualizza | | 43/18.1 R |
| 7,454,862 B2 * | 11/2008 | Markley et al. | | 43/23 |
| 7,533,484 B2 * | 5/2009 | Markley et al. | | 43/18.1 R |
| 7,533,485 B2 * | 5/2009 | Nyland | | 43/21.2 |
| 7,707,766 B2 * | 5/2010 | Millen et al. | | 43/23 |
| 7,854,086 B2 * | 12/2010 | Huynh | | 43/23 |
| 2002/0189149 A1 * | 12/2002 | Borgeat | | 43/18.1 |
| 2004/0088900 A1 * | 5/2004 | Irrgang et al. | | 43/23 |
| 2005/0072037 A1 * | 4/2005 | Markley et al. | | 43/23 |
| 2006/0086033 A1 * | 4/2006 | Barrett | | 43/23 |
| 2006/0096153 A1 * | 5/2006 | Jung | | 43/18.1 R |
| 2006/0230669 A1 * | 10/2006 | Markley et al. | | 43/23 |
| 2007/0033855 A1 * | 2/2007 | Jung | | 43/18.1 R |
| 2007/0214708 A1 * | 9/2007 | Millen et al. | | 43/23 |
| 2008/0028665 A1 * | 2/2008 | Barrett | | 43/23 |
| 2008/0229648 A1 * | 9/2008 | Evensen | | 43/23 |
| 2008/0244956 A1 * | 10/2008 | Gant et al. | | 43/23 |
| 2009/0013584 A1 * | 1/2009 | Selfors | | 43/23 |
| 2009/0293339 A1 * | 12/2009 | Bartholomew | | 43/18.1 R |
| 2010/0251596 A1 * | 10/2010 | Malcarne | | 43/23 |

FOREIGN PATENT DOCUMENTS

| | | | | |
|---|---|---|---|---|
| GB | 2369026 A | * | 5/2002 | |
| JP | 07327557 A | * | 12/1995 | |
| JP | 08140533 A | * | 6/1996 | |
| JP | 08191649 A | * | 7/1996 | |
| JP | 09266740 A | * | 10/1997 | |
| JP | 10146142 A | * | 6/1998 | |
| JP | 10276627 A | * | 10/1998 | |
| JP | 2000060371 A | * | 2/2000 | |
| JP | 2000270724 A | * | 10/2000 | |
| JP | 2001061380 A | * | 3/2001 | |
| JP | 2002051672 A | * | 2/2002 | |
| JP | 2002209482 A | * | 7/2002 | |
| JP | 2003319738 A | * | 11/2003 | |
| JP | 2004081064 A | * | 3/2004 | |
| JP | 2005073565 A | * | 3/2005 | |
| JP | 2005304420 A | * | 11/2005 | |
| JP | 2006158362 A | * | 6/2006 | |
| JP | 2006187239 A | * | 7/2006 | |
| JP | 2006191874 A | * | 7/2006 | |
| JP | 2007244352 A | * | 9/2007 | |
| JP | 2007282596 A | * | 11/2007 | |
| JP | 2008017793 A | * | 1/2008 | |
| JP | 2008048619 A | * | 3/2008 | |
| JP | 2008131885 A | * | 6/2008 | |
| JP | 2009131200 A | * | 6/2009 | |
| NO | 324033 B1 | | 6/2007 | |
| SE | 309339 | | 3/1969 | |
| WO | WO 9109518 A1 | * | 7/1991 | |
| WO | 2007064217 A1 | | 6/2007 | |

* cited by examiner

HANDLE FOR FISHING ROD

CROSS REFERENCE TO RELATED APPLICATION(S)

This application claims the benefit of Norwegian Patent Application No. 20073599, filed Jul. 12, 2007, and Norwegian Patent Application No. 20076177, filed Nov. 30, 2007, the disclosures of which are incorporated herein in their entirety by reference.

TECHNICAL FIELD OF THE INVENTION

The present invention relates to a fishing rod, especially fit for fly-fishing, comprising an elongated, thin and flexible body equipped with a spinning reel for a fishing line, attached to the rod at the rear end of the rod, and a gripping device comprising at least one handle, attached to the rod at the rear end of the rod.

BACKGROUND OF THE INVENTION

Casting with a fishing rod, and a fly rod in particular, is all about managing the casting technique. For the angler it is of importance to "present" a fly as far out from the rod as possible. This requires a good casting technique, using a fishing rod with optimal qualities.

Casts with conventional double handed fly rods are made using both hands. Today's traditional double handed fly rods are equipped with a fore and a butt handle, where both are connected to the rod's centre axis and longitude.

The butt handle makes up a part of the rod's rear end, positioned at the rear end of the reel seat of the rod. On conventional, prior art rods, the placement of the butt handle surrounding the centre axis of the rod may cause a detrimental position of the arm in the elbow and shoulder joints, seen in relation to a natural and anatomically correct movement pattern. Through long term use and repeated movements, the detrimental arm position may cause stress and strain injuries.

In order to create a powerful flick and to make the best possible use of the maximum resilience and elasticity of the rod, the application of force on a doublehanded fly rod should mainly be carried out with the lower arm—that is from the butt handle. Most anglers perform an enclosing grip around the butt handle by holding the whole central palm of the hand in contact with the handle. An incorrect position may be caused because the elbow joint is being pushed away from the body at the same time as the shoulder is getting a prominent and strained position.

The prior art fore handles for fly rods are almost standardized, the actual fore handle being mainly made of cork material or foam rubber. It is common for the prior art fore handles that the handle itself is physically glued in its entire length directly to the oblong, thin and elastic body, often referred to as the "blank". A physically glued handle will contribute to a stiffening of the rear part of the rod. It gives stability, but it will also have a restrictive effect on the resilience and elasticity of the rod, because the blank is physically stiffened in the "glued" area.

Since the fore grip constitutes an integrated and rigid part of the rod, the elastic motion of the blank will start at the fore end of the handle, farthest away from the end of the rod.

The power needed for performing a cast with a fly rod is inflicted by hand, and the energy is transferred to the rod at the point of the grip, enclosed by the hand. The power is further transferred to the fly line or the bait/fly through the part of the blank which lies between this point and the top of the rod. The elastic nature of the blank material makes it bend like a bow and receive a potential energy which, once released, will give the fly line and the bait/fly an accelerating motion either forwards or backwards. The part of the blank which is below the point where the hand encloses the grip, will not receive a potential energy/being bent, and will thus not contribute to the acceleration of the bait/fly. The flexibility and resilience of the blank is thereby limited, since essential power reserves of a fishing rod lie in the lower part of the blank.

U.S. Pat. No. 1,351,473 discloses a fishing rod where the grip is equipped with a handle in the shape of a tubular body. The rearmost end of the blank is fastened inside the rear end of this tubular body, in a way that to a certain extent allows the blank to move relative to the tubular body inside the tubular body. At its open end, the tubular body is provided with a cone shape design.

SUMMARY OF THE INVENTION

An object of the solution according to the invention is to provide a handle that gives an ideal accuracy and a maximum utilisation of the inherent flexibility of the rod, as well as providing an ergonomically correct grip and casting motion.

Another object of the solution according to the invention is to provide a butt handle and a fore handle preventing or at least reducing strains on skeleton, tendons and muscles in wrist, shoulder and arm, even for repetitive use during long periods of time.

Another object of the invention is to provide a rod with butt and fore handles that improve the grip on the rod, and which being anatomically correct.

Yet another object of the invention is to provide a fishing rod that enables good casting without requiring the use of great force and a lot of energy, and that improves the resilience and the inherent elasticity of the rod during the casting.

An additional object of the invention is to provide a fishing rod giving the angler a sense of casting with greater accuracy, since an anatomically designed butt handle will enable a better performance of the rod and the cast.

Another additional object of the invention is to provide a rod that gives greater acceleration and speed during the actual cast, due to the position and the shape of the handle in relation to the blank, thus giving a longer path of motion in the forward cast.

Yet another object of the invention is to provide a fishing rod which enables a reduction of the required force necessary to achieve an increased length of the cast, since the resilience and the elasticity of the rod are better exploited.

Yet an additional object of the invention is to provide a fishing rod where the fore grip of the rod is in a normal distance from the butt handle of the rod, without reducing the rod's inherent resilience and elasticity.

Another object of the invention is to make longer casts with less use of energy.

According to the invention, the objects are achieved with a fishing rod as further defined in the characterizing part of claim 1, read in connection with the preamble of the claim.

Various embodiments of the invention are defined in the dependent claims.

By developing a butt handle based on human anatomy, the butt handle of the rod will give a better anatomic position of the hand and thus contribute to an anatomically more correct arm movement during the casting. This reduces the strain on arm and shoulder.

The butt handle is angled in relation to the centre axis of the rod in such a way that the wrist is kept in a natural and relaxed angle as the hand grabs the handle.

In addition, the handle is placed in a way making the palm of the hand naturally enclosing the handle. This improves distribution of pressure and blood circulation in the palm of the hand and through the arm. It is common knowledge that good circulation reduces the risk of tendonitis and other strain injuries, as well as reducing the risk of cold fingers on cold days.

Furthermore, the position of the butt handle is positioned offset from the centre axis of the rod.

Moreover, an anatomically natural position of the arm generates a greater transfer of energy to the cast itself since the position of the arm during the casting movement approximately corresponds to oscillating arm movement during steady walking.

The position of the butt handle outside the centre axis of the rod allows a longer path of motion between the starting and stopping points during casting. This may in turn facilitate longer casts.

According to one variant of the invention, the butt handle is shaped as an elliptic cylindrical body. The handle may preferably be designed with profiles or surfaces that are adjusted to the palm of the hand and the grip of the fingers. The end face of the butt handle may be rounded.

The angle between the centre axis of the butt handle and the centre axis of the rod may be in the range between 40 to 70 degrees and preferably within 50 to 60 degrees, ideally around 54 degrees.

According to another embodiment, the butt handle may be fixed to the blank by means of an angular lever arm, which is attached to the butt handle's backmost end. The angle between the centre axis of the angular lever arm and the centre axis of the butt handle may be in the range between 90 to 120 degrees.

The angular lever arm may have a cross section which is considerably smaller than the cross section of the butt handle, providing space for the thumb to lie as close as possible to the centre of the angular lever arm.

According to one embodiment of the invention, the fore handle is provided with at least one longitudinal recess or slot on the side of the handle pointing in the same direction as the reel, so that the blank more or less freely may oscillate laterally relative to the handle. The fore handle may furthermore only be attached to the rod along maximum one half of the length of the handle, in order to prevent the physical interaction of the blank material and the enclosing handle in at least the anterior half of the handle. Moreover, it is an advantage to provide the fore handle with a corresponding opening arranged diametrically in relation to said first slot. Said second slot may have a smaller longitudinal extension than the first slot.

The fore handle is preferably fitted parallel to the longitudinal direction of the rod, enclosing the centre axis of the rod, and may preferably be almost circular at its rear section, constituting the fastening area. The fore handle can gradually be shaped into an elliptic cylindrical form along its fore part, and can be configured on the rod in such a manner that the longitudinal slot in the fore part of the handle is orientated in the same direction as the reel, so that the blank may oscillate freely relative to the handle.

The inner surface of the fore handle may be covered with a friction reducing and shock absorbing material in order to avoid wear of the blank and of the inner surface of the fore handle. The fore handle may also be covered with a friction enhancing and soft material, allowing a comfortable grip that stays firm under all conditions. This material may for example consist of foam rubber, cork laminate or textile.

Furthermore, the surface of the fore handle may be formed with grip enhancing devices such as furrows or perforations, arranged on the lateral surfaces of the handle, giving increased friction and a steadier grip.

According to the invention, a fishing rod giving improved casting lengths is obtained. Additionally, a rod giving less strain to the angler's back, shoulder and arms is provided, while casting lengths may be increased without the use of increased force.

In addition, the solution provides an increased utilization of the inherent elasticity and resilience of the blank material. The rod according to the invention will also contribute to giving the blank increased flexibility in the plane of symmetry of the fore handle, while the lateral motions are still being limited by the handle. Such solution gives the angler increased control, and restricts undesirable lateral motions of the blank.

According to the invention, the rod will provide an anatomically better grip than a rod with a round handle because of the elliptical fore handle, which physically fills the palm of the hand in a better way. It also gives the grip a better directional stability during the actual casting. The handle according to the invention may also be used as a handle on surf rods, spinning rods and traditional casting rods.

According to one embodiment of the invention, the fishing reel is fixed directly to the handle in such a way that the blank is free from physical contact with the surrounding handle as far as the rearmost part of the rod.

According to the invention, the fore handle is configured in a way that allows the oblong, thin and elastic body to move relative to the fore handle. The handle may preferably include a formed body which is stable and tubular, fastened to the rod only at the rear end of the handle and configured in such a manner that the rear part of the rod is allowed to oscillate freely in relation to the fore part of the formed body, and inside of this body. The fore handle may be described as a tubular body where the fore, lower part is open or made by elastic material and which preferably also has an open upper part.

BRIEF SUMMARY OF THE DRAWINGS

One embodiment of the invention shall in the following be described more closely with references to the accompanying drawings, where.

DETAILED DESCRIPTION IN CONNECTION TO THE DRAWINGS

Figure 1:
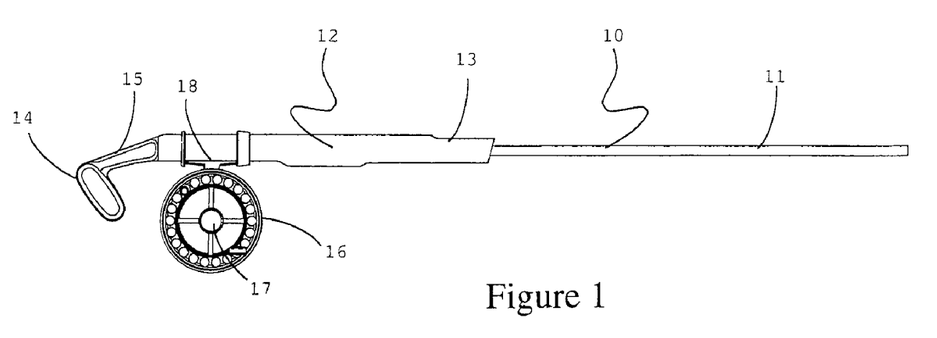
FIG. 1 shows a view, partly in section, of the rear part of a fishing rod for fly fishing, equipped with a gripping device according to the invention.

FIG. 1 shows a view of the rear part of a fishing rod 10 for fly fishing, including an oblong, thin and elastic body 11 and equipped with a gripping device 12 comprising a fore handle 13 and a butt handle 14 according to the invention. The rod 10 is further equipped with a reel 16 that contains a line (not shown) rolled up on the reel 16. The reel 16 rotates around an axis 17 located perpendicularly on the longitude axis of the rod 10. The reel 16 is attached to the rod 10 by means of conventional fasteners, well known to a person skilled in the art, such as axially movable rings on the rod 10 and levers on the seat of the reel 16.

The butt handle 14 is attached to the end of an angular lever arm 15 in such a way that the centre axis of the butt handle 14 forms an angle $\beta$ with the centre axis of the rod 10, said angle being in the range of approximately 40 to 70 degrees and preferably within 50 to 60 degrees, ideally around 54 degrees. As indicated in the Figure, the butt handle 14 is in the shape of an elliptic cylindrical body.

Figure 2:
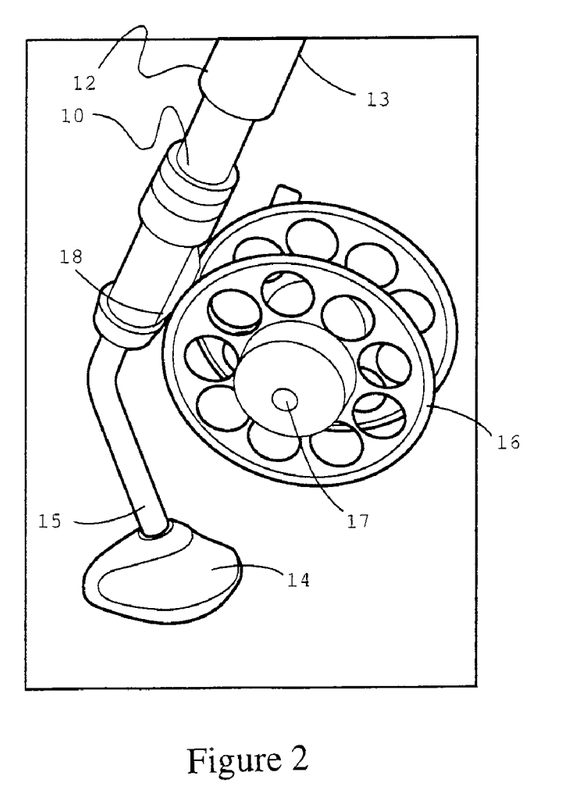
FIG. 2 shows in greater detail a view of the butt handle of the gripping device according to a second embodiment of the invention.

FIG. 2 shows a close-up perspective of the rear part of the rod 10, equipped with a butt handle 14 according to the invention. As shown in FIG. 2, the butt handle 14 is fastened to the rod 10 by way of an angular lever arm 15. The lever arm 15 is configured in such a manner that the butt handle 14 is located in the same plane as the reel 16 and line guides (not shown) fastened on the rod 10 in front of the reel 16. Furthermore, according to the embodiment shown, the lever arm 15 is configured so that even the lever arm 15 is located in the plane mentioned above.

Figure 3:
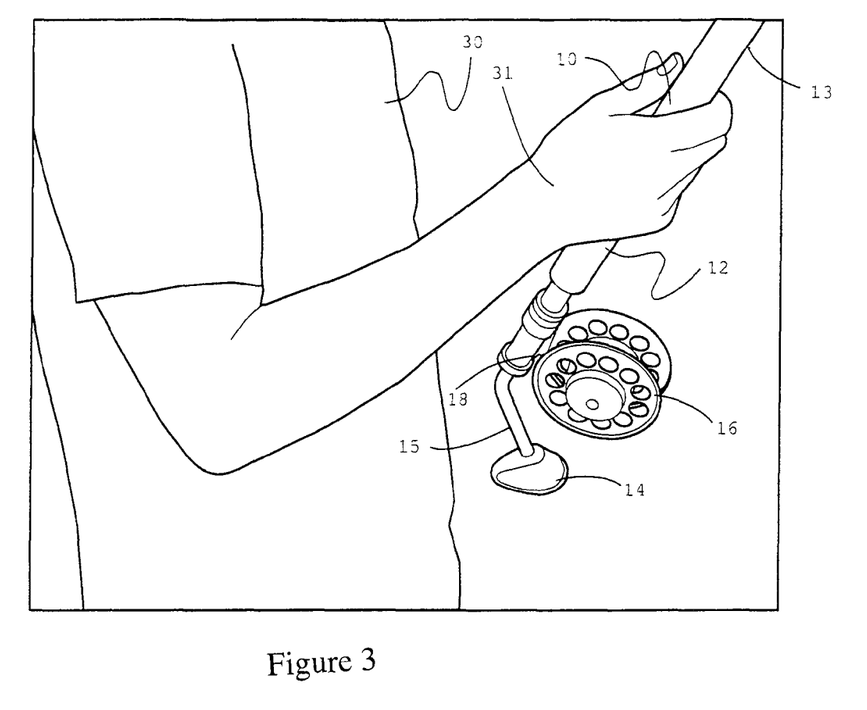
FIG. 3 shows a general outline of the fore handle on the fishing rod prior to casting.
Figure 4:
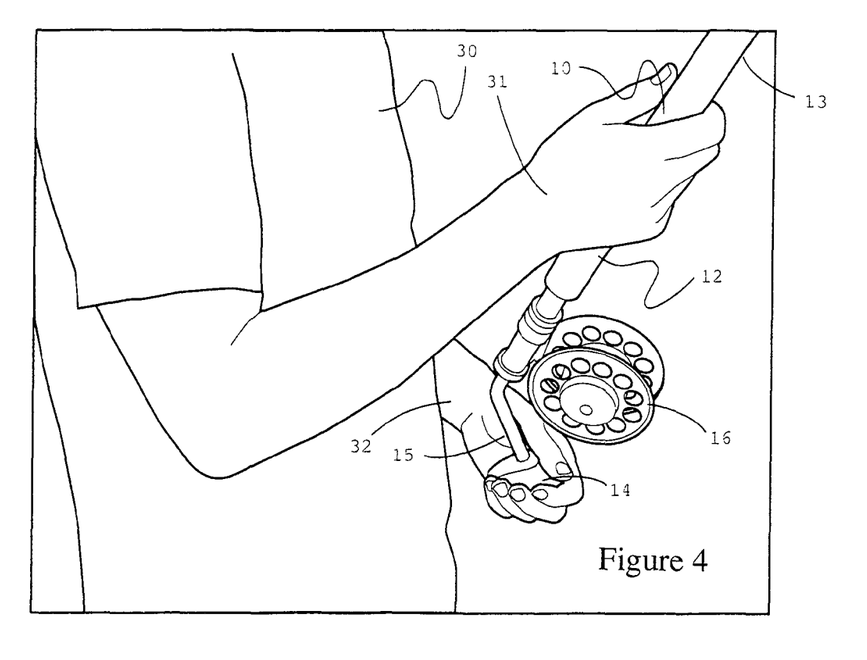
FIG. 4 shows the butt handle according to the invention, and also the angler's grip on the butt handle.
Figure 5:
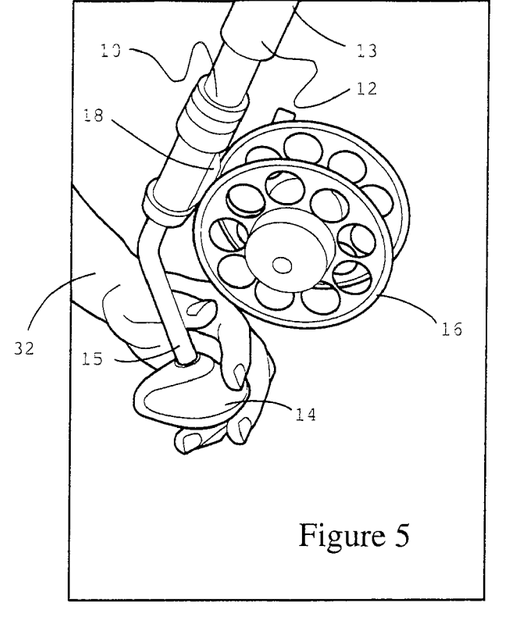
FIG. 5 shows an alternative grip around the butt handle, according to the invention.

The FIGS. 3-5 show the rod 10 with the angler 30 handling the rod 10. FIG. 3 shows a situation where the angler 30 only grips the handle 13 with his right hand 31, while FIG. 4 shows a situation where the angler grips the fore handle 13 with his right hand and with his left hand 32 he grips the butt handle 14. FIG. 4 shows one firm grip around the butt handle 14, while FIG. 5 shows an alternative grip around the butt handle 14.

As shown, the angled butt handle 14 is designed so as to fit naturally into the palm of the hand 32. The actual forward cast may be performed with mainly two grips, —i) by holding a steady, enclosing grip where the thumb is on top (ref FIG. 4), or ii) by holding a two-finger grip through drawing back with the fore and middle fingers upon forward casting, ref. FIG. 5.

Both of these gripping positions will give the rear casting arm an anatomically correct arm position in elbow and shoulder joints.

Figure 6:
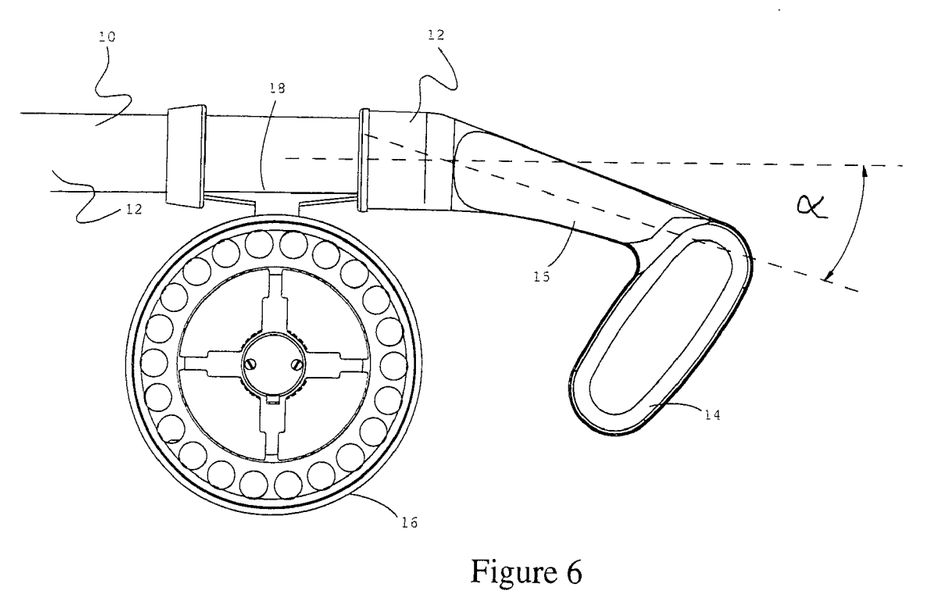
FIGS. 6-8 show in detail the lower part of a fishing rod equipped with the gripping device according to the present invention, where the different angles are indicated.
Figure 7:
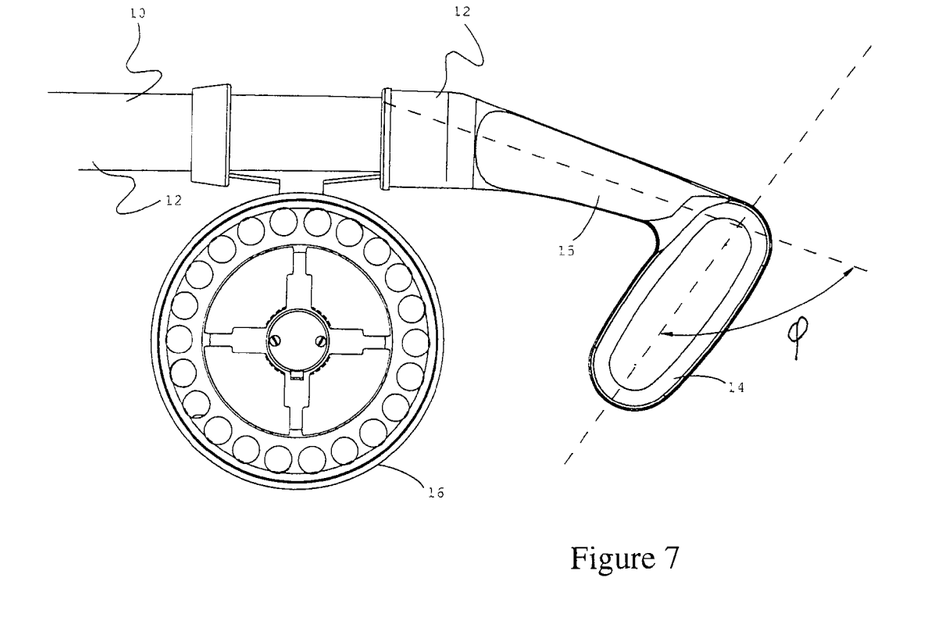
Figure 8:
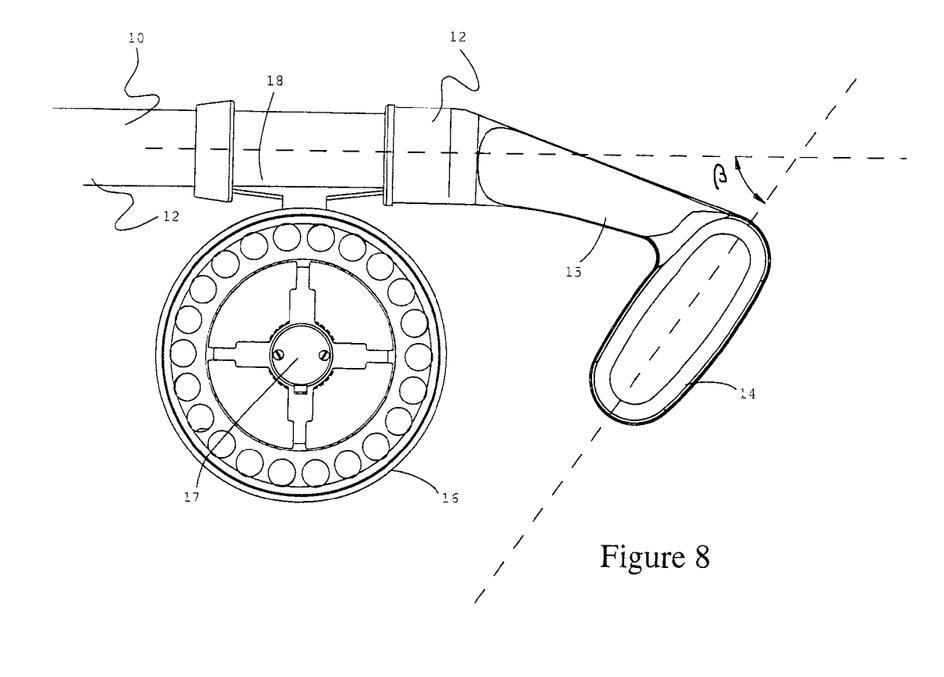

FIGS. 6-8 show in detail the rear part of a fishing rod 10 equipped with the butt handle 14 according to the present invention, where various angles used are indicated. As shown in FIG. 6, the rod 10 is equipped at its rear end with a reel 16 and an angular lever arm 15, which at its bottommost end is equipped with a handle 14. The angular lever arm 15 forms an angle $\alpha$ with the longitudinal axis of the rod 10. This angle may approximately be between 5 degrees and 40 degrees, preferably between 10 degrees and 25 degrees and ideally around 18 degrees.

As shown in FIG. 7, the centre axis of the butt handle 14 creates an angle $\phi$ with the longitudinal axis of the angular lever arm 15. This angle may preferably be between 90 to 120 degrees, while in FIG. 8 it is apparent that an angle $\beta$ is formed between the centre axis of the fishing rod 10 and the centre axis of the handle 14. This angle is of a size between 40 to 70 degrees, preferably between 50 to 60 degrees and ideally around 54 degrees. The angle $\beta$ is essential for the angler, because this corresponds to the placement and angle of his/her hands.

The position of the butt handle 14 in relation to the rod 10 will create a 7-10 cm longer path of motion in the forward cast compared to traditional fishing rods. This is particularly favourable in the case of a so-called spey cast, and will give a greater acceleration and speed to the cast itself.

The actual cast is performed with two hands, 31, 32, with the energy and path of motion mainly being created from the butt handle 14, because the greatest resilience lies in the rear part of the blank 11. By using the clock as a reference (12 o'clock is rod straight up, 9 o'clock flat forward, 3 o'clock flat backwards), one may say that the cast oscillates between 10 o'clock and 2 o'clock (stopping point between forward and back casts). The forward cast starts in the rear position (approximately 2 o'clock). The rear hand 32 grips the butt handle 14, pulling it towards the body with an accelerating movement, and stopping abruptly when touching the lower abdominal area. The top of the rod 10 is flung in an accelerating movement forward and stops at approximately 10 o'clock, pointing forward. The arm gripping the fore handle should keep its elbow joint locked in an angle of approximately 90 degrees during the whole casting motion, and pivot around the axis of the shoulder joint. As mentioned earlier, the essential energy is applied with the lower hand.

Additionally, the prominent position of the butt handle 14 results in a shorter path of motion in the back cast in traditional overhead cast, making it easier make an early stop in the rear "2 o'clock" position. This creates an additional advantage in that the line is being stretched out in a higher initial position, avoiding hitting the ground or the bushes behind the angler.

It should be mentioned that the grip shown in FIG. 4 facilitates the maximum use of force, while the grip shown in FIG. 5, described as the finger grip, is intended for maximum precision.

The angled lever arm 15 of the butt handle 14 is narrowing in its lower part, the transition to the actual handle, in order to give space for an ideal placement of the thumb, especially, but not exclusively, by use of a thumb grip with the thumb on top.

It should be mentioned that the fishing line (not shown) may be equipped with backing, shooting line, shooting head and leader. Since none of these items form part of the invention, and since such items are well known to a person skilled in the art, these are not shown and will not be described. Moreover, it should be mentioned that the fishing rod 10 is further equipped with line guides, through which the line runs. These are not a part of the invention either, and will thus not be described any further.

Even though the FIGS. 2-5 and 9-10 show a lever arm 15 with a circular cross section it may be of interest to use a lever arm 15 that has a rectangular low-width cross section, in order to allow the placement of the thumb as close to the centre line of the lever arm 15 as possible, and where the height of the cross section of the lever arm 15 is chosen to give the greatest possible strength. To reduce the weight without reducing the strength, the lever arm 15 may possibly be perforated or equipped with laterally arranged openings.

Figure 9:
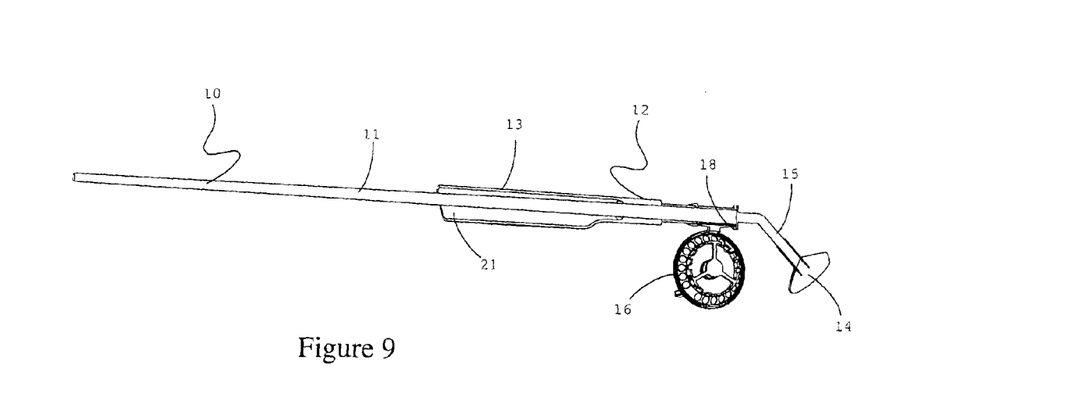
FIG. 9 shows a view, partly in section of the lower part of a fishing rod, also equipped with a fore handle according to the invention.

FIG. 9 shows a sketch of the lower part of a fishing rod 10, preferably a fly rod. The fishing rod 10 has a front and rear end, but only the rear end is shown. The rod 10 is composed of a blank 11, and a gripping device 12 with a corresponding fore handle 13 and a butt handle 14 attached to the rear part of the rod 10. Behind the fore handle 13, the rod 10 has a corresponding reel seat 18 and a reel 16 with line (not shown). The reel 16 rotates around an axis (not shown) positioned perpendicularly to the longitudinal direction of the rod. The reel 16 is attached to the rod 10 by means of conventional fasteners, well known to a person skilled in the art, such as axially movable rings on the rod 10 and protruding levers on the reel 16 base. The line runs through several line guides (not shown) mounted on the rod 10 and comes forward through a top guide at the top of the rod 10.

On double handed rods, there is an additional butt handle 14, which constitutes the rear part of the rod 10, ref. FIG. 9. The fore handle 13, which is constructed as an elliptical, hollow tube, is made from a light and strong material such as carbon or basalt fibre, graphite and/or Kevlar®, and it may be covered with for example foam rubber, cork laminate and/or textile on the outside. Inside the front half of the fore handle, the blank 11 is configured to bend more or less freely. The handle 13 is not physically glued to the blank 11 along this part. The handle 13 is physically fastened to the blank 11 at the rear half of the handle 13. The space between the blank 11 and the inner surface 21 of the handle 13 has, according to this embodiment, been filled with a soft rubber foam material in order to avoid the possible entrance of undesirable dirt and particles between the blank 11 and the inner surface 21. The handle 13 is parallel with the longitudinal direction of the rod, and encloses the centre axis of the rod 10. The hollow handle 13 is almost circular in its rear part—the fastening section—and is thereafter gradually shaped into a marked elliptical form in its front section. The elliptical form gives the blank 11 increased freedom of motion during casting because there is a physical distance between the inner surface 21 of the handle 13 and the blank 11. Contact between the blank 11 and the inner surface of the handle 13 during normal use of force, is thus avoided. The handle 13 is mounted on the blank 11 in such a position that the major axis of the nearly elliptical cross-section lies in the primary plane of movement of the blank 11, i.e. that the distance between the blank 11 and the handle 13 is longer in the vertical direction, thus avoiding the creation of a break point during casting.

Figure 10:
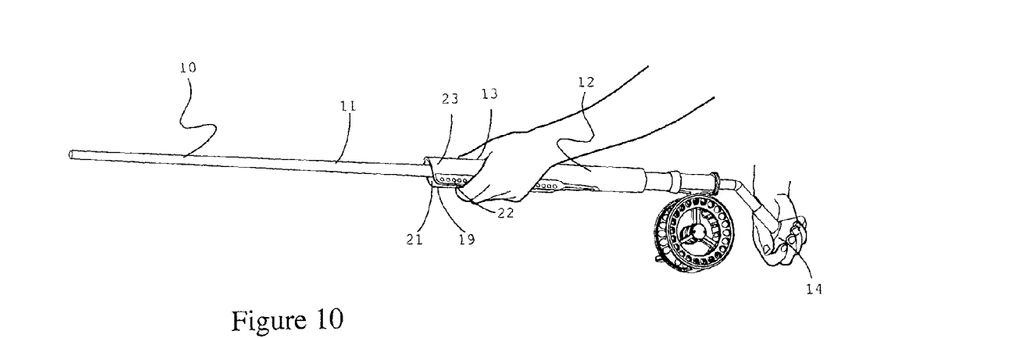
FIG. 10 shows a view of the lower part of a fishing rod equipped with a gripping device according to the present invention, and also showing the angler's grip on the butt handle and the fore handle of the gripping device.

FIG. 10 shows the gripping device 12 according to the invention, seen from one side. Externally, the fore handle 13 is covered with different materials to give the handle optimum qualities. The materials may be cork laminate, soft rubber foam and textile. These have unique qualities and are considered used to achieve a firmer and more comfortable grip under all conditions (cold, warm, wet, dry). Externally, the handle may be equipped with grip enhancing devices 22, such as furrows 22 or perforations. Such devices on the surface give an increased friction and a firmer grip. The use of furrows 22 or perforations is intended at the lower front part of the handle 13, which is the normal casting grip area. The fore part of the handle 13 is intended to be equipped with a comfortable external tactile covering 23, such as cork laminate, foam rubber and/or textile.

Figure 11:
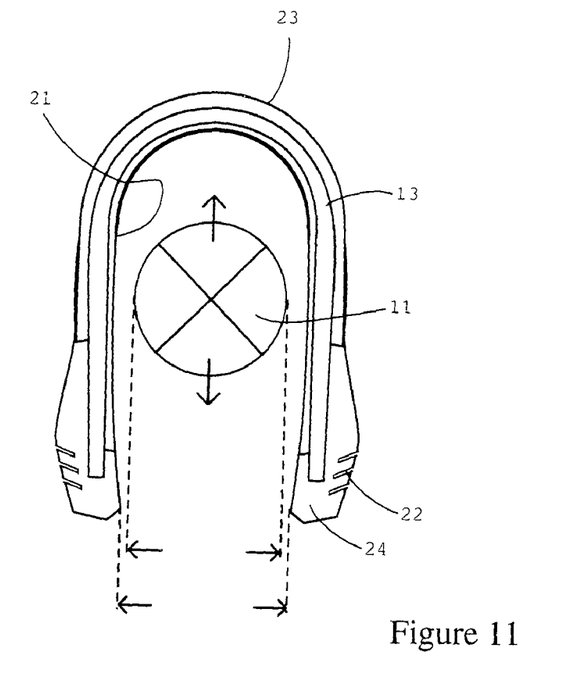
FIG. 11 shows a cross section of a handle according to the invention, visualizing the way the handle surrounds the blank; the allowed direction of motion, as well as the position of various materials, fixed to the handle itself.

FIG. 11 shows a section through the rod 10 where the blank 11 is centred inside the handle 13. The external diameter of the blank 11 is smaller than the internal width of the handle 13. The lower and upper front parts of the handle 13 are open, so that the blank 11 is allowed to bend unobstructed upwards and downwards, during casting and for example when reeling in big and strong fish, where the strain on the blank 11 may be great, and also to enable the inner surface 21 of the handle to be covered with friction reducing and shock absorbing material to avoid wear of the surface of the blank 11 and the inner surface of the handle 13. On the outside, the handle 13 is covered with friction enhancing and soft material 23—giving a both comfortable and firm grip under all kinds of conditions. Additionally, the use of rubber foam, cork laminate or textile is possible, making it pleasant to hold the handle 13 under all kinds of conditions (cold, warm, wet, dry). Grip enhancing areas shall be developed on the sides of the handle 13, such as furrows or perforations 22 on the surface, which gives an increased friction and a firmer grip.

Figure 12:
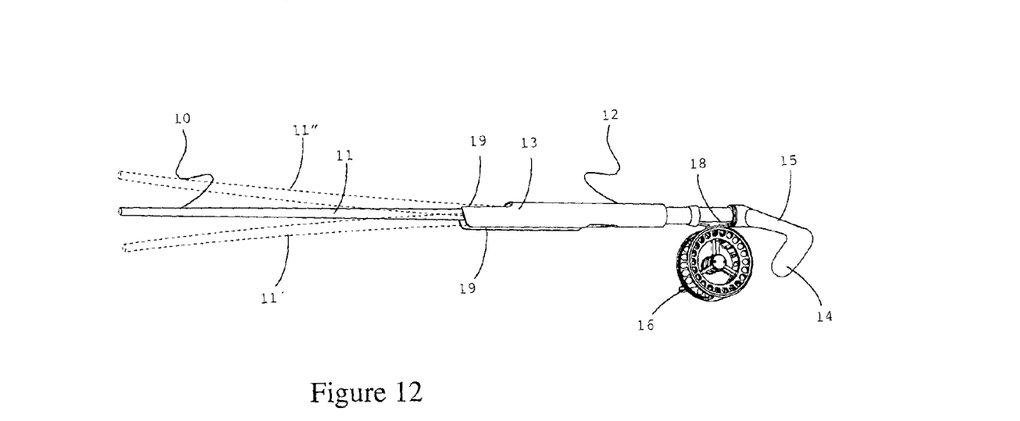
FIG. 12 shows a view of the lower part of a fishing rod, equipped with a gripping device according to the invention, where the Figure shows how the blank bends within the fore half of the fore handle.

FIG. 12 shows how the blank 11 is allowed to bend freely inside at least the front half of the handle 13. The elliptical form of the handle 13 makes it possible for the blank 11 to bend unobstructed during forward casting 11' as well as during backward casting 11", without touching the inner surface of the handle 13. The load of energy on the rod 10 is definitely greatest when the blank 11 is bent downward 11' for example when reeling in big and strong fish. The load is also great during overhead casting. This makes the rod 10 bend during the backward cast as well as during the forward cast. The sideways bend will be much smaller because of the direction of the forces in play.

As described above, the rod 10 is equipped with a hollow handle 13, which is attached to the fishing rod 10 only at its lower part, thus enabling the lower part of the blank 11 to bend freely within the upper part of the handle 13. This gives an increased utilization of the elasticity and resilience of the blank 11. According to the invention, the point around which the blank 11 is allowed to oscillate is moved closer to the lower end of the rod 10, without a subsequent backwards move of the fore handle 13.

Moreover, the hollow handle 13 is approximately circular or slightly elliptical in its rear part where the blank 10 is fastened, and thereafter gradually shapes into a marked elliptical form in its front part. The elliptical form gives the blank 11 a free path of motion during casting, because there is a physical distance between the handle 13 and the blank 11. Contact between the blank 11 and the inner surface of the handle 13 during normal use of force, is thus avoided. The handle 13 is mounted on the blank 11 in such a position that the major axis of the nearly elliptical cross-section lies in the primary plane of movement of the blank, i.e. that the distance between the blank 11 and the handle 13 is greater in the vertical direction, while the sideways distance between the blank 11 and the handle 13 is smaller. An increased flexibility in the vertical plane of the blank 11 is thus obtained, whereas the handle 13 will still limit the lateral movements of the blank 11. This gives the angler increased control, and reduces undesirable lateral movements of the blank 11. A possible appearance of a break point during casting is thus avoided, because the blank 11 oscillates more in the vertical plane, and considerably less sideways.

In anatomical terms, an elliptical fore handle 13 is also better than a circular handle because it physically fills the palm of the hand in a better way, while it gives a steadier directional grip during the actual casting. The lower and upper front parts of the handle 13 have purposeful openings or slots 19, so that the blank 11 shall be able to bend unobstructed upwards and downwards, for example when reeling in big and strong fish, and there is a heavy load of force on the tip of the rod 10.

Figure 13:
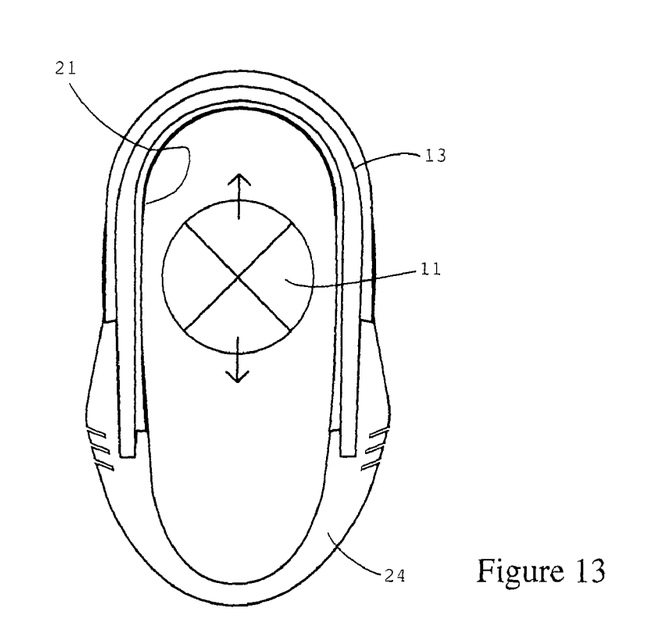
FIG. 13 shows a cross section of a closed handle according to the invention, indicating how a closed handle surrounds the fishing rod, with the lower part of the closed handle consisting of a flexible material.

FIG. 13 shows a cross section of a closed handle 13, where the lower part of the closed handle 13 consists of a flexible material 24 that makes it possible for the blank 11 to bend practically unhindered although the handle is "closed". The handle is closed in order to prevent undesirable dirt and particles from entering the handle between the blank 11 and the inner surface 21 of the handle 13.

Figure 14:
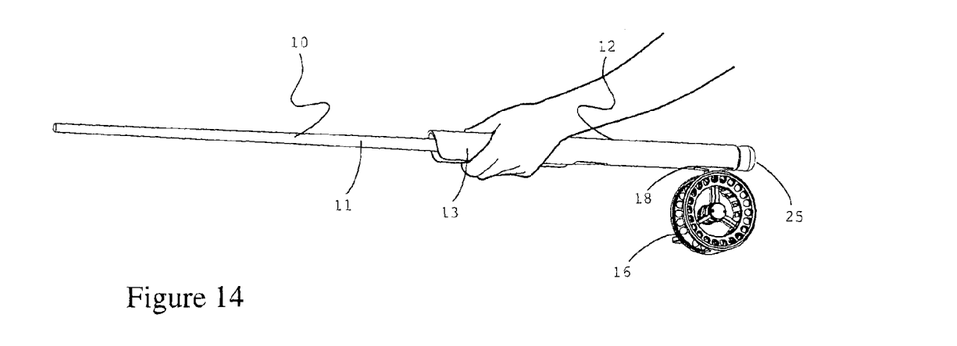
FIG. 14 shows a sketch of the lower part of a single-handed fishing rod equipped with a gripping device according to the present invention, indicating how the reel is fastened directly to the gripping device.

FIG. 14 shows the handle 13, seen from one side of a single-handed fishing rod 10. The handle 13 may be used on single-handed and double-handed casting rods. The principles are the same for both of said rods 10: The handle 13 allows the blank 11 freedom of movement during casting, because there is a physical distance between the handle 13 and the blank 11. The blank 11 is allowed to bend freely inside at least the front half of the handle. The handle 13 is not physically glued to the blank 11 in this section. The handle 13 is physically fastened to the blank 11 at no more than the rear half of the handle 13.

Figure 15:
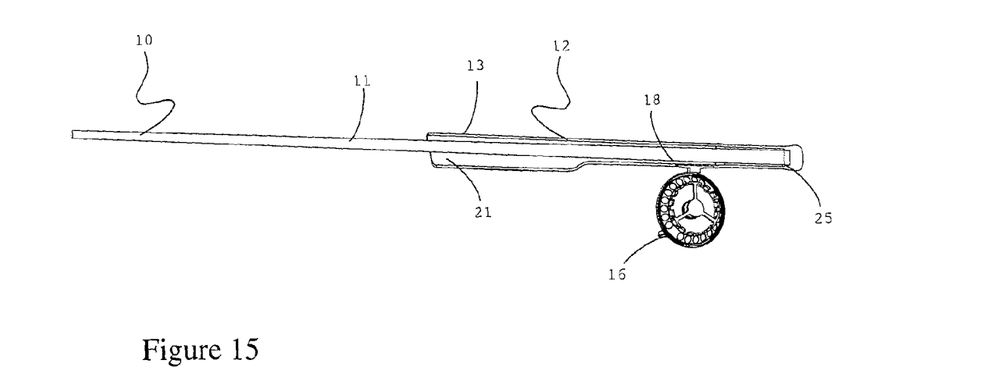
FIG. 15 shows a sectional view of the lower part of the fishing rod according to the invention, indicating how the reel is fixed directly to the gripping device in a way allowing the blank to move freely inside the gripping device as far as the rearmost part of the rod.

FIG. 15 shows a sectional drawing of the lower part of a double-handed fishing rod 10, equipped with a handle 13 according to the present invention, as the figure shows how the reel 16 is seated directly on the handle 13, thus enabling the blank 11 to move freely inside of the handle 13 as far as the rear part of the rod 10. According to one embodiment of the invention, the fishing reel 16 is seated directly on the handle 13 in such a way that the blank 11 is without physical contact with the surrounding handle 13 as far as the rear part 25 of the rod 10.

Figure 16:
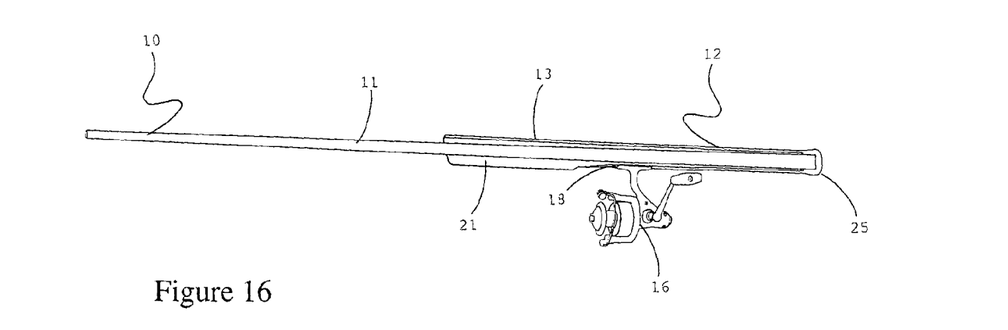
FIG. 16 shows a sectional view of the lower part of a double handed fishing rod—specifically a spinning rod—equipped with a gripping device according to the invention, as the figure indicates how the blank may move freely inside the gripping device as far as the rearmost part of the rod.

FIG. 16 shows a sectional drawing of the lower part of a double-handed fishing rod 10, specifically a spinning rod; equipped with a handle 13 according to the present invention, where the figure shows how the reel 16 is seated directly on the handle 13 so that the blank 11 may move freely inside of the handle 13 as far as the rear part 25 of the rod 10. According to one embodiment of the invention, the fishing reel 16 is seated directly on the handle 13 in such a way that the blank 11 is without physical contact with the surrounding handle 13 as far as the rear part 25 of the rod 10.

The invention claimed is:

1. A fishing rod, comprising:
an oblong, thin and elastic rod;
a reel for a fishing line, seated on the rod at a rear part of the rod; and
a gripping device comprising a fore handle arranged on the rear part of the rod, in an area where the reel is attached to the rod,
the fore handle comprising a rigid tubular body attached to the rear part of the rod so that only a rear part of the tubular body is attached to the rod,
the fore handle being configured to allow a relative lateral movement of a rear portion of the rod in relation to the fore handle,
wherein the fore handle is provided with at least one longitudinal opening or slot both formed transversely through a wall of the fore handle and extending from an end of the fore handle in a direction parallel with the longitudinal axis of the rod, and said fore handle is configured to enable relative lateral movement of the rear portion of the rod in relation to the fore handle such that a portion of said rod can bend into said at least one opening or slot and move outside said fore handle.

2. A fishing rod, comprising:
an oblong, thin and elastic rod;
a reel for a fishing line, seated on the rod at a rear part of the rod;
a gripping device comprising at least one of a fore handle and a butt handle arranged on the rear part of the rod, in an area where the reel is attached to the rod,
the fore handle comprising a rigid tubular body attached to the rear part of the rod so that only a rear part of tubular body is attached to the rod,
the fore handle being configured to allow a relative lateral movement of a rear portion of the rod in relation to the fore handle,
wherein the butt handle comprises a lever which forms an angle α in relation to a longitudinal axis of the rod and a grip attached to the lever and offset from the longitudinal axis of the rod, and
the butt handle grip having an approximately elliptic cylindrical form with a longitudinal axis which both forms an angle β in relation to the longitudinal axis of the rod and is transverse in relation to the lever, intended to lie naturally in a palm of a hand of an angler,
wherein the fore handle is provided with at least one longitudinal opening or slot both formed transversely through a wall of the fore handle and extending from an end of the fore handle in a direction parallel with the longitudinal axis of the rod, and said fore handle is configured to enable relative lateral movement of the rear portion of the rod in relation to the fore handle such that a portion of said rod can bend into said at least one opening or slot and move outside said fore handle, and
wherein said angle α is between 5 and 40 degrees and said angle β is between 40 and 70 degrees.

3. The fishing rod according to claim 2, wherein the approximately elliptic cylindrical body is formed with traces or surfaces that are adjusted to the palm of the hand and a finger-grip.

4. The fishing rod according to claim 2, wherein the approximately elliptic cylindrical body is broadest at an end that points away from the rod.

5. The fishing rod according to claim 2, wherein the longitudinal axis of the approximately elliptic cylindrical body forms an angle φ with the lever, which is approximately 90 to 120 degrees.

6. The fishing rod according to claim 2, wherein the lever is fastened to the butt handle grip at a rear end of the lever.

7. The fishing rod according to claim 2, wherein the angle α is around 10 to 25 degrees.

8. The fishing rod according to claim 2, wherein the lever has a cross section which is considerably smaller than the cross section of the fore handle and/or the cross section of the butt handle grip.

9. The fishing rod according to claim 2, wherein the gripping device is configured to facilitate several different grips, depending on the angler and on phase of the cast.

10. The fishing rod according to claim 2, wherein the fore handle is only fixed to the rod along not more than half of a length of the fore handle, so that the rod is not in physical contact with the surrounding fore handle in at least a forward half of the fore handle.

11. The fishing rod according to claim 2, wherein the butt handle grip is formed at a rear part of the lever which comprises a fastening area.

12. The fishing rod according to claim 2, wherein an inner surface of the fore handle is covered with friction reducing and shock absorbing material, in order to avoid wear of a surface of the rod and an inner surface of the fore handle.

13. The fishing rod according to claim 2, wherein the reel is being fastened directly to the fore handle.

14. The fishing rod according to claim 2, wherein said lever and grip of the butt handle are disposed in a plane of the reel.

15. A fishing rod, comprising:
   an oblong, thin and elastic rod;
   a reel for a fishing line, seated on the rod at a rear part of the rod; and
   a gripping device comprising a fore handle and a butt handle arranged on the rear part of the rod, in an area where the reel is attached to the rod,
   the fore handle comprising a rigid tubular body attached to a rear end of the rod so that only a rear part of the tubular body is attached to the rod,
   the fore handle being configured to allow a relative lateral movement of a rear portion of the rod in relation to the fore handle,
   wherein the butt handle comprises a lever which forms an angle in relation to a longitudinal axis of the rod and a grip attached to the lever and offset from a longitudinal axis of the rod,
   wherein the butt handle has an approximately elliptic cylindrical form with a longitudinal axis which is transverse in relation to the lever, intended to lie naturally in a palm of a hand of an angler, and
   wherein the fore handle is provided with at least one longitudinal opening or slot at least on a side of the gripping device where the reel is seated, wherein said at least one longitudinal opening or slot is configured to enable relative lateral movement of the rear portion of the rod in relation to the fore handle such that a portion of said rod can bend into said at least one opening or slot and move outside said fore handle.

* * * * *